US00RE36566E

United States Patent [19]

Pringle

[11] E Patent Number: Re. 36,566

[45] Reissued Date of Patent: Feb. 15, 2000

[54] SPOOLABLE COILED TUBING MANDREL AND GAS LIFT VALVES

[75] Inventor: Ronald E. Pringle, Houston, Tex.

[73] Assignee: Camco International Inc., Houston, Tex.

[21] Appl. No.: 09/005,890

[22] Filed: Jan. 13, 1998

Related U.S. Patent Documents

Reissue of:

[64] Patent No.: 5,483,988
Issued: Jan. 16, 1996
Appl. No.: 08/241,256
Filed: May 11, 1994

[51] Int. Cl.[7] ..... F04F 1/20

[52] U.S. Cl. ..... 137/155; 166/117.5; 166/320

[58] Field of Search ..... 137/155; 166/117.5, 166/320

[56] References Cited

U.S. PATENT DOCUMENTS

| | | | |
|---|---|---|---|
| Re. 29,870 | 12/1978 | Moore et al. | 166/117.5 |
| 1,919,233 | 7/1933 | Lee | 251/122 X |
| 2,725,014 | 11/1955 | Pryor | 417/111 |
| 2,731,977 | 1/1956 | McGowen, Jr. | 137/155 |
| 2,790,395 | 4/1957 | Garrett et al. | 417/109 |
| 2,790,501 | 4/1957 | Garrett et al. | 417/109 X |
| 3,208,398 | 9/1965 | Douglas | 103/232 |
| 3,741,299 | 6/1973 | Terral | 166/117.5 |
| 4,310,143 | 1/1982 | Determan | 137/625.64 X |
| 5,170,815 | 12/1992 | Going, III et al. | 137/155 |
| 5,172,717 | 12/1992 | Boyle et al. | 137/155 |
| 5,176,164 | 1/1993 | Boyle | 137/155 |
| 5,782,261 | 7/1998 | Becker | 137/155 |

FOREIGN PATENT DOCUMENTS

| | | |
|---|---|---|
| 2507673 | 5/1982 | France . |
| 2173843 | 10/1986 | United Kingdom . |
| 2239472 | 9/1993 | United Kingdom . |
| 2281329 | 3/1995 | United Kingdom . |
| 2281576 | 3/1995 | United Kingdom . |

OTHER PUBLICATIONS

Brochure entitled "The Spooler Series: New Coiled Tubing Production Equipment from BST Lift Systems", by BST Lift Systems, Inc.; Ventura, California; pp. 1–12; (undated).

Findings of Fact and Conclusions of Law, Camco International Inc. v. BST Lift Systems, Inc., Civil Action No. 95–232, U.S. District Court for the Southern District of Texas, Oct. 30, 1996.

Final Judgment, Camco International Inc. v. BST Lift Systems, Inc., Civil Action No. 95–232, U.S. District Court for the Southern District of Texas, Oct. 30, 1996.

Judgment, Camco International Inc. v. BST Lift Systems, Inc., U.S. Court of Appeals for the Federal Circuit, No. 97–1144, Jul. 11, 1997.

*Primary Examiner*—Gerald A. Michalsky
*Attorney, Agent, or Firm*—Williams, Morgan & Amerson

[57] ABSTRACT

A spoolable, flexible sidepocket mandrel positioned in a coiled tubing having an orienting sleeve, a sidepocket, and a deflector guide in which the pocket includes a plurality of separate pocket parts and the guide includes a plurality of separate guide parts, all secured to the inside of a housing for allowing the mandrel to be longitudinally flexible and spoolable. A retrievable longitudinally flexible, spoolable gas lift valve is adapted to be inserted into and retrieved from the sidepocket. The gas lift valve may be of various types including an adjustable flow gas lift valve.

24 Claims, 12 Drawing Sheets

Fig. 3
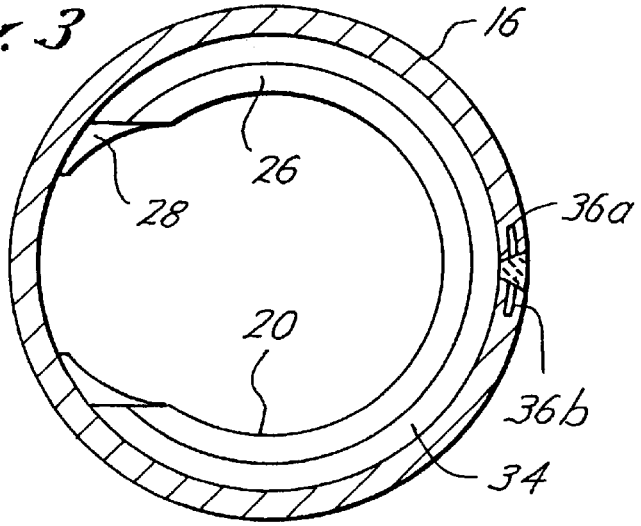
Fig. 4
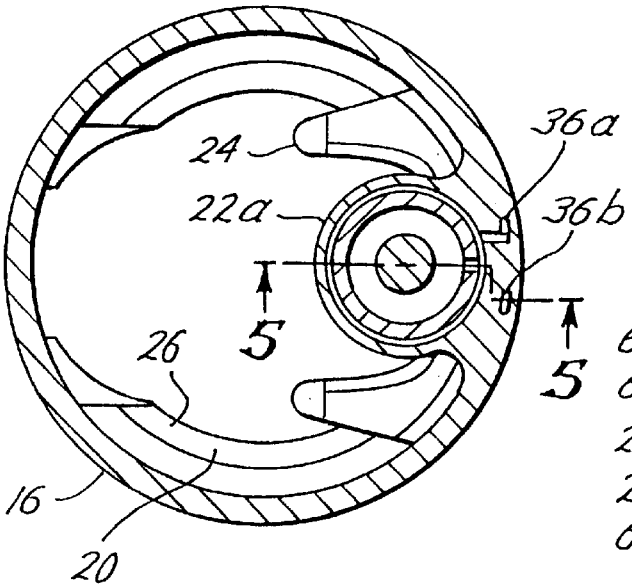
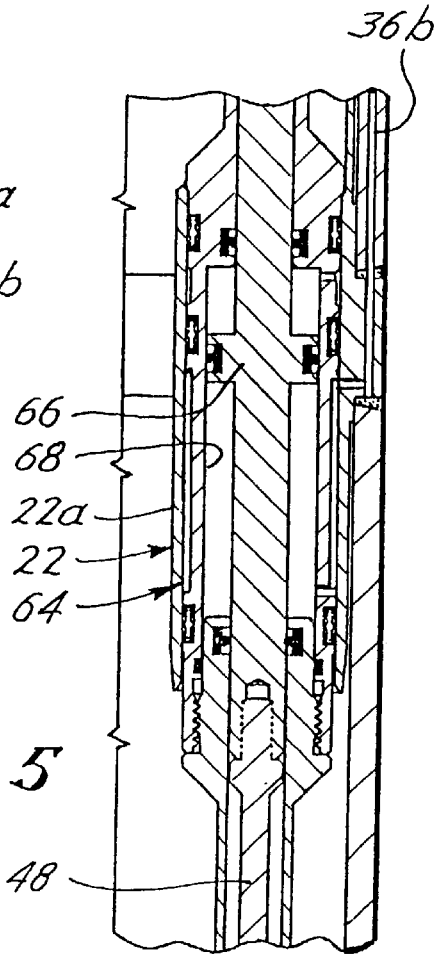
Fig. 5

SPOOLABLE COILED TUBING MANDREL AND GAS LIFT VALVES

Matter enclosed in heavy brackets [ ] appears in the original patent but forms no part of this reissue specification; matter printed in italics indicates the additions made by reissue.

BACKGROUND OF THE INVENTION

The present invention is directed to a spoolable coiled tubing mandrel that is positioned in a coiled tubing and is longitudinally flexible for spooling and gas lift valves that are wireline retrievable and longitudinally flexible and spoolable.

It is known, as disclosed in U.S. Pat. No, 5,170,815, to provide a longitudinally flexible and spoolable gas lift valve that is permanently mounted within the internal diameter of a coiled tubing. However, in order to repair or replace such valves, the coiled tubing string must be pulled in its entirety, and such permanently mounted valves prevent through tubing wireline work to be performed in the coiled tubing.

The present invention is directed to providing coiled tubing mandrels and gas lift valves that are not only longitudinally flexible for allowing their being spoolable on to the coiled tubing reel, but they have an external flush outside diameter of the same size as the coiled tubing, have an internal offset sidepocket which allows gas lift valves to be wireline inserted and retrieved from the mandrels, and the mandrels have a through bore for performing other wireline work without removing the gas lift valves. In addition, the gas lift valves may be of various types and are longitudinally flexible and spoolable and in one embodiment a gas lift valve is provided which may be opened, closed or provide any desired port size by control from the well surface.

SUMMARY

It is one object of the present invention to provide a spoolable flexible sidepocket mandrel positioned in a coiled tubing in which the mandrel includes a flexible spoolable circular housing having the same size and shape as the coiled tubing and forms a portion of the coiled tubing. A mandrel housing includes an open bore communicating with the coiled tubing. An orienting sleeve is secured to the inside of the housing for aligning a flow control device in the housing. A sidepocket is offset from the open bore for receiving a flow control device and the pocket includes a plurality of separate pocket parts, each of which is secured to the inside of the housing for providing longitudinal flexibility. A deflector guide is aligned with the sidepocket and the guide includes a plurality of separate guide parts each of which is secured to the inside of the housing for providing longitudinal flexibility.

Another object of the present invention is wherein the outside of the orienting sleeve, the pocket parts, and the guide parts are spaced from the inside of the housing and the orienting sleeve, the pocket parts and the guide parts are secured to the inside of the housing at a point intermediate to their respective ends. Such a structure provides for greater longitudinal flexibility of the mandrel.

A further object of the present invention is wherein the mandrel includes a flexible boot positioned between the orienting sleeve and the inside of the housing for allowing flexing of the sleeve relative to the housing and also preventing well tools from hanging up on the ends of the sleeve.

Still a further object is the provision of at least one hydraulic control line within the housing wall of the mandrel.

Still a further object is the provision of a flexible boot positioned between at least some of the guide parts and the inside of the housing and a flexible boot positioned between at least some of the pocket parts and the inside of the housing for providing longitudinal flexibility of the mandrel.

A still further object of the present invention is the provision of a retrievable, longitudinally flexible and spoolable gas lift valve adapted to be inserted into and retrieved from the sidepocket.

Yet a further object of the present invention is a provision of a retrievable, flexible and spoolable gas lift valve for use in a coiled tubing which includes a housing, the housing having an inlet, an outlet and a flow controlling valve operatively positioned between the inlet and the outlet. A gas charged bellows is connected to and controls the operation of the flow controlling valve and a gas containing compartment is in communication with the bellows. A setting and pulling head is connected to the body. The body includes a plurality of separated, longitudinally extending ribs connected to the head for providing longitudinal flexibility. Preferably, the ribs surround the gas containing compartment.

Still a further object of the present invention is the provision of an adjustable flow gas lift valve which includes a body having an inlet, a variable size passageway, and an outlet, An actuator is longitudinally movable in the body for varying the size of the passageway and a hydraulic piston and cylinder assembly is connected to the actuator for moving the actuator. Preferably, the piston and cylinder assembly is double acting. Sensing means are provided connected to the actuator for determining the position of the actuator. Preferably, the variable size passageway includes an orifice port and a plurality of different sized valve elements movable relative to the port. Preferably, the different sized valve elements are connected to the actuator.

A still further object is wherein the sensing means includes a series of collet grooves and a shoulder movable relative to the grooves.

Yet a still further object is wherein the adjustable gas lift valve includes a sleeve telescopically movable relative to the body for opening and closing the inlet. Preferably, first and second shoulders are provided on the actuator for engaging and moving the sleeve in opposite directions.

Still a further object is wherein the actuator includes a universal joint for allowing the valve to be longitudinally flexible and spoolable.

Yet a still further object of the present invention is wherein the valve includes a valve seat between the inlet and the outlet and one of the valve elements is sized to seat on the valve seat for opening and closing the valve seat on movement of the actuator.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 3 is a cross-sectional view taken along the line 3—3 of FIG. 1A, FIG. 4 is a cross-sectional view taken along the line 4—4 of FIG. 1C, FIG. 5 is a cross-sectional view taken along the line 5—5 of FIG. 4.

DESCRIPTION OF THE PREFERRED EMBODIMENT

Figure 1A:
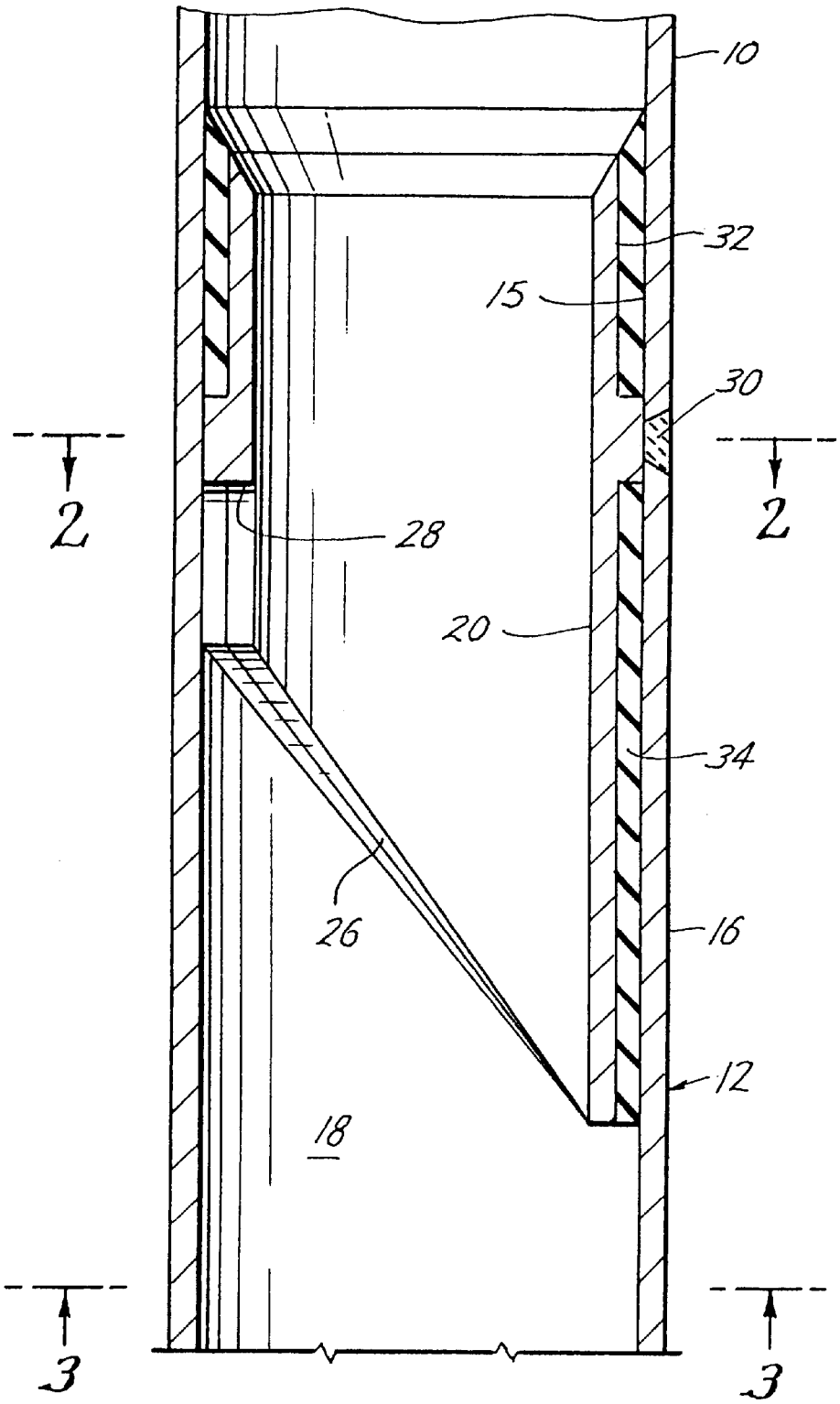
FIGS. 1A, 1B, 1C, 1D, and 1E are continuations of each other and form an elevational view, in cross section, of a flexible, spoolable mandrel of the present invention which includes one type of gas lift valve in the running position.

The present invention will be described, for purposes of illustration only, as a single spoolable, flexible sidepocket mandrel capable of holding various types of gas lift valves. However, it is to be understood that each coiled tubing may include one or more mandrels and gas lift valves of the present invention vertically connected in the coiled tubing and spaced from each other as is done in conventional gas lift systems. Furthermore, while various embodiments of gas lift valves are disclosed as being positioned in the sidepocket of a mandrel, it is to be understood that such gas lift valves may be utilized in other components in a coiled tubing.

Referring now to the drawings, and particularly to FIGS. 1A, 1B, 1C, 1D and 1E, the reference numeral 10 generally indicates a conventional coiled tubing, the reference numeral 12 generally indicates a spoolable, flexible sidepocket mandrel positioned in the coiled tubing 10 and the reference numeral 14 generally indicates a gas lift valve, here illustrated as an adjustable gas lift valve positioned in the mandrel 12.

The mandrel 12 generally includes a housing 16 having an open bore 18 therethrough in communication with the coiled tubing 10 and for allowing movement of various well tools, an orienting sleeve 20, a sidepocket 22 offset from the open bore for receiving a flow control device, and a deflector guide 24 aligned with the sidepocket 22. Such a sidepocket mandrel is generally described in U.S. Pat. No. 3,741,299.

However, the present mandrel 12 is longitudinally flexible for positioning in a coiled tubing and spoolable upon a coiled tubing reel. The housing 16 is a flexible, spoolable circular housing having the same size and shape as the coiled tubing 10 and forms a portion of the coiled tubing 10.

The orienting sleeve 20 includes an upwardly directed helical surface 26 for rotationally orienting a kickover tool for properly aligning a flow control device such as the gas lift valve 14 for insertion into the sidepocket 22. The orienting sleeve also includes an actuating shoulder 28 for actuating a kickover tool such as shown in U.S. Reissue Patent No. RE 29,870, for installing or removing a flow control device from the sidepocket 22. Preferably, the orienting sleeve 20 is secured to the inside of the housing 16 such as by a weld 30 at a point between the top and bottom of the orienting sleeve 20 allowing the majority of the outside 32 of the orienting sleeve 20 to be spaced from the inside 15 of the housing 16 thereby allowing the orienting sleeve 20 to flex longitudinally relative to the housing 16 for allowing greater flexibility of the mandrel 12. Preferably, a flexible boot 34 is positioned between the outside of the orienting sleeve and the inside 15 of the housing 16, which, while allowing flexing of the orienting sleeve 20 relative lo the housing 16, prevents well tools from catching between the orienting sleeve 20 and the housing 16. The flexible boot 34 may be of any suitable material, such as rubber or a suitable plastic.

Figure 1B:
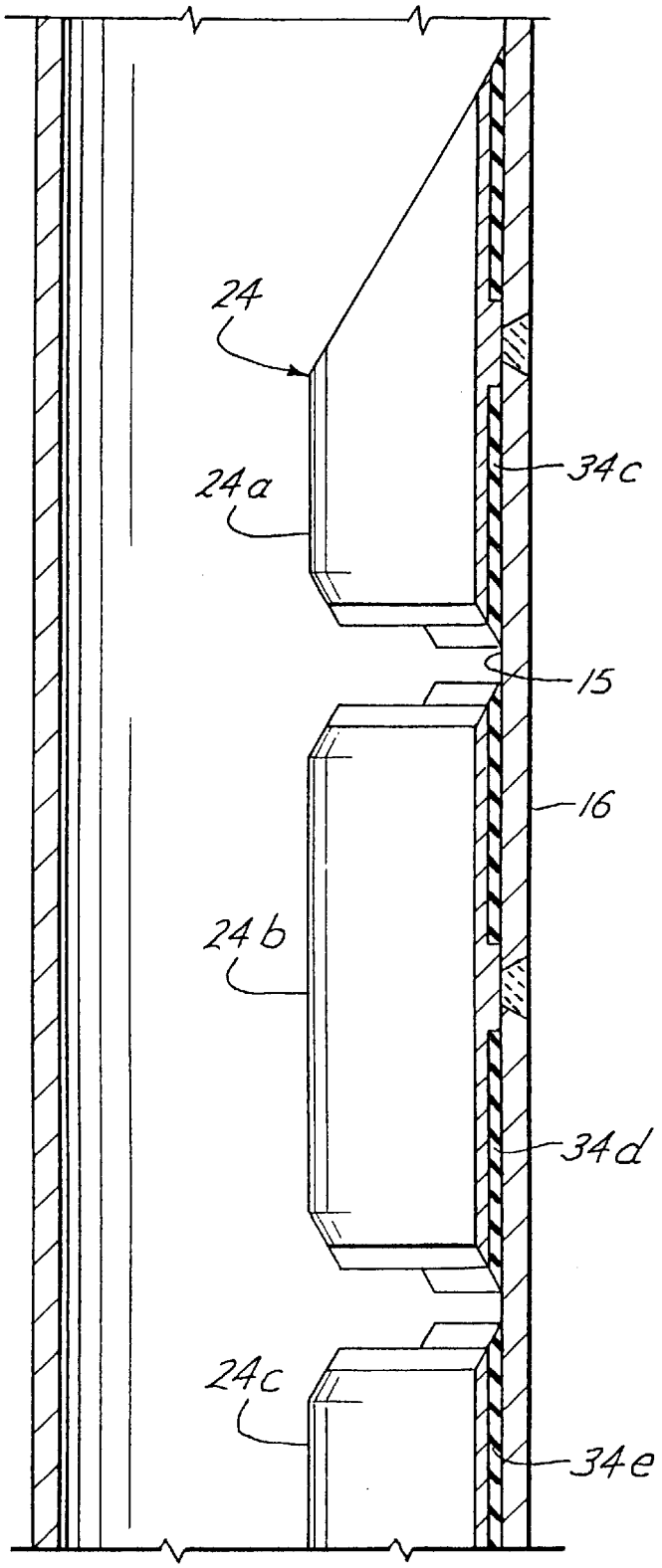
Figure 1C:
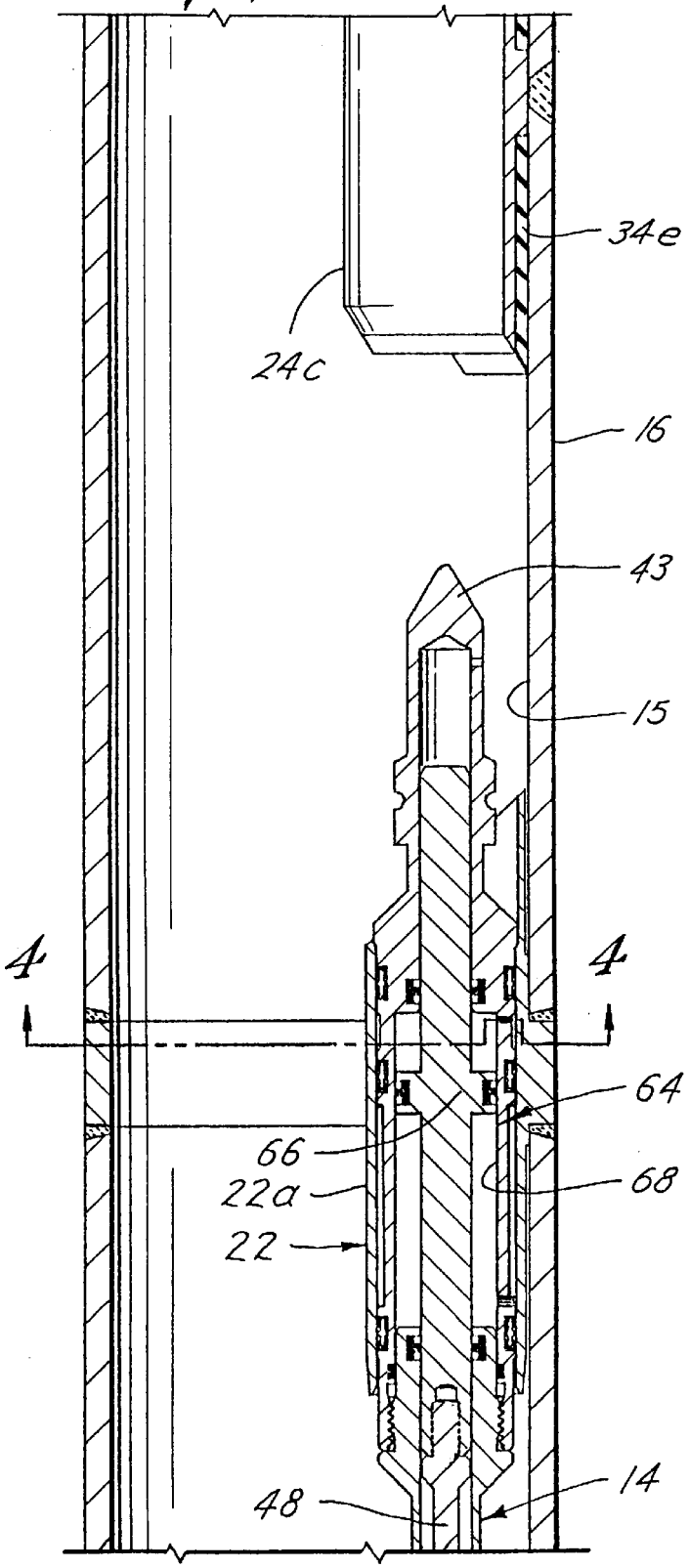
Figure 1D:
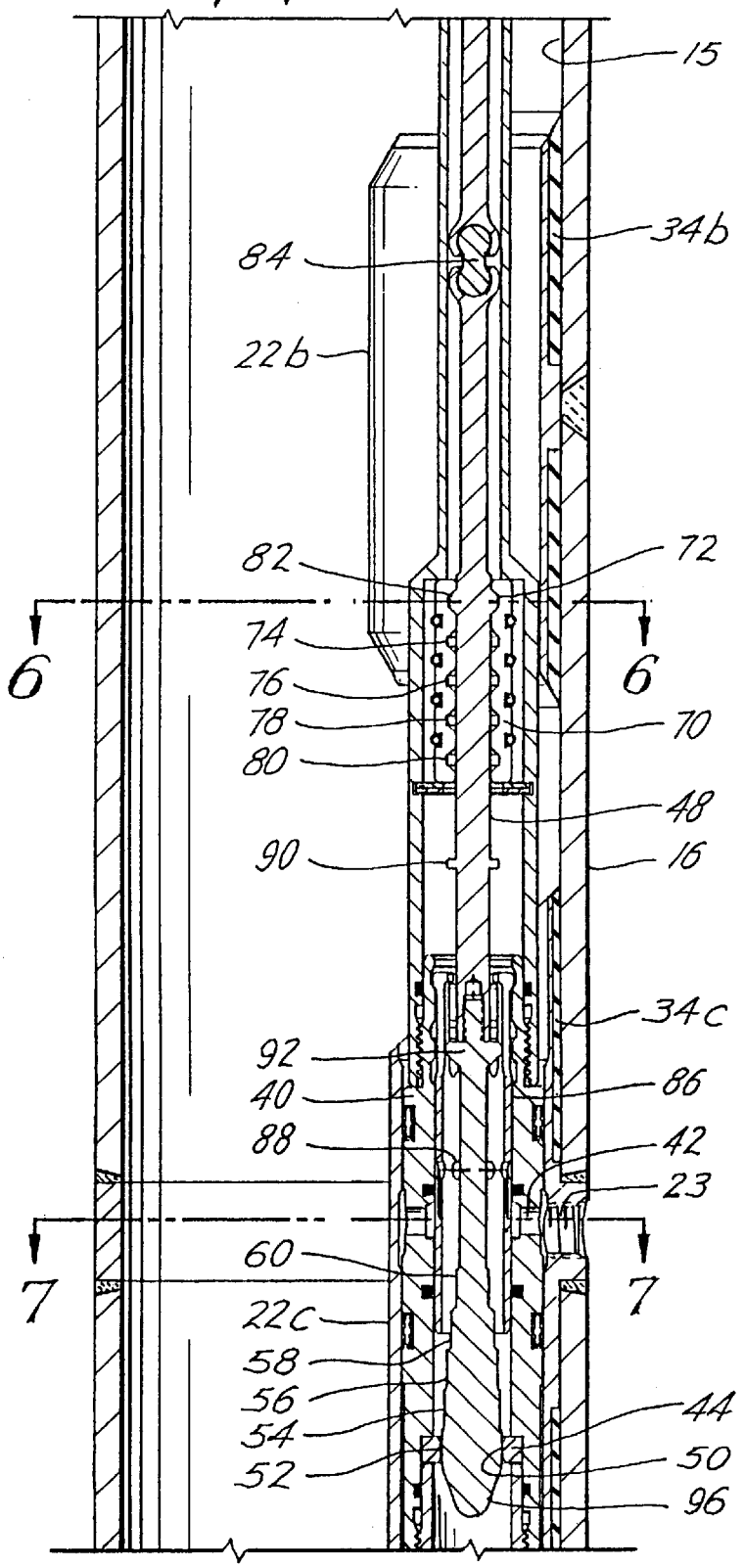
Figure 1E:
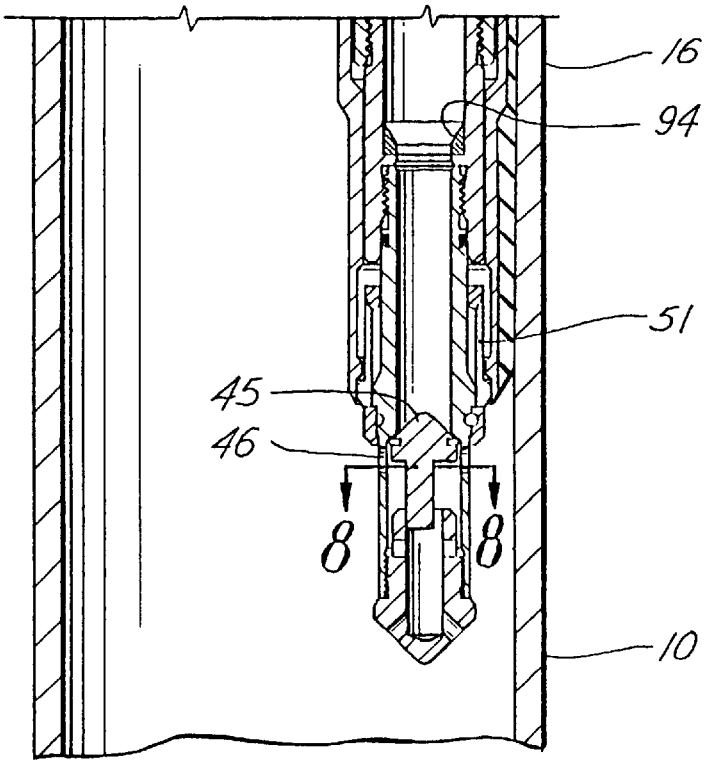

Referring now to FIGS. 1C, 1D and 1E, the sidepocket 22 includes a plurality of separate pocket parts 22a, 22b and 22c each of which is secured to the inside of the housing 16, such as by welds intermediate the ends of the parts 22a, 22b and 22c. The separated sidepocket 22 thus allows the housing 16 to be longitudinally flexible and spoolable. A flexible boot is positioned between at least some of the pocket parts and the inside 15 of the housing 16. Thus, a flexible boot 34b is positioned between part 22b and the inside 15 of the housing 16 and flexible boot 34c is positioned between the inside of the pocket part 22 and the inside 15 of the housing 16. No boot is required between the pocket part 22a and the inside of the housing 16 as the space is sufficiently small to prevent the entrance of other well tools. Again, it is noted that the outside of the pocket parts 22a, 22b and 22c are spaced from the inside 15 of the housing 16 for allowing the housing 16 to be longitudinally flexible and spoolable.

Referring now to FIGS. 1B and 1C, the deflector guide 24 includes a plurality of separate guide parts 24a, 24b and 24c, each of which is secured to the inside 15 of the housing 16 such as by welds intermediate the ends of the parts 24a, 24b and 24c. And the outside of the parts 24a, 24b and 24c are spaced from the inside 15 of the housing 16 for allowing greater longitudinal flexibility of the housing 16. A flexible boot is positioned between at least some of the guide parts 24a, 24b and 24c and the inside 15 of the housing 16, such as flexible boots 34c, 34d, and 34e, respectively.

Figure 2:
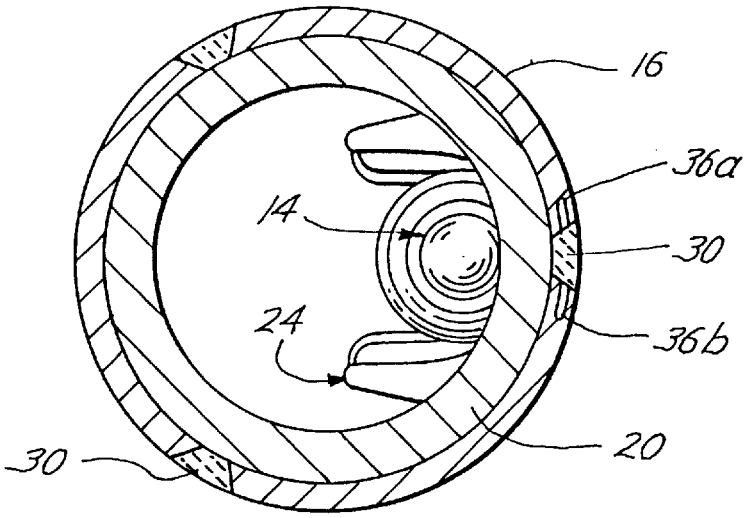
FIG. 2 is a cross-sectional view taken along the line 2—2 of FIG. 1A.
Figure 6:
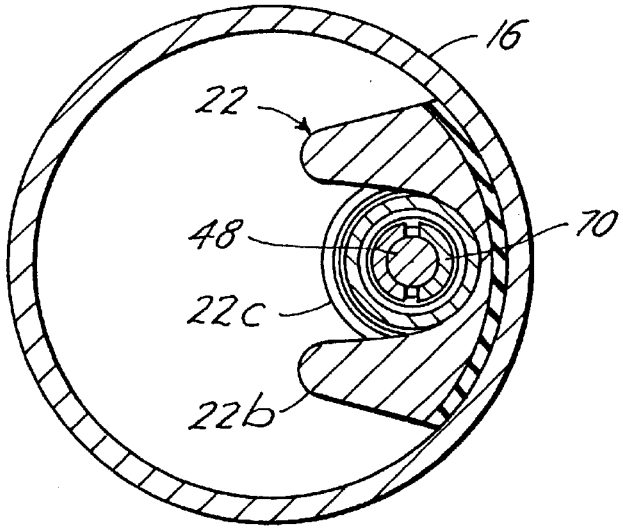
FIG. 6 is a cross-sectional view taken along the line 6—6 of FIG. 1D.
Figure 7:
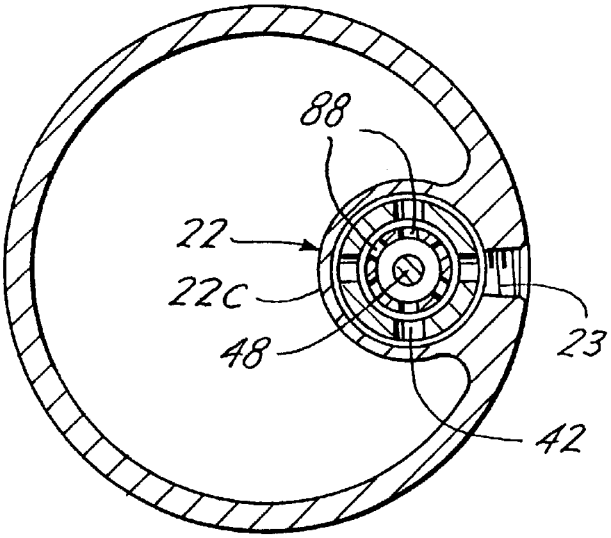
FIG. 7 is a cross-sectional view taken along the line 7—7 of FIG. 1D.
Figure 8:
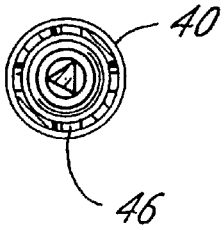
FIG. 8 is a cross-sectional view taken along the line 8—8 of FIG. 1E, FIGS. 9A and 9B are continuations of each other and form an elevational view, in cross section, of the gas lift valve shown in FIGS. 1C, 1D and 1E, but in the open position.

Therefore, the mandrel 12 of the present invention provides a mandrel which is flexible, is spoolable on a coiled tubing reel, provides an orienting sleeve and sidepocket for wireline inserting and retrieving flow control devices, such as gas lift valves 14 in the sidepocket 22, has an external flush outside diameter for mating with the coiled tubing 10, and includes a through bore 18 for wireline work in the coiled tubing 10 without removing the gas lift valve 14. In addition, the particular mandrel 10 may also include one or more hydraulic control lines 36a and 36b (FIGS. 2, 3, and FIG. 5), for actuating the particular type gas lift valve 14.

Referring now to FIGS. 1C, 1D and 1E, 4, 5, 6 and 7, the adjustable gas lift valve 14 positioned in the sidepocket 22 is best seen. The gas lift valve 14 includes a body 40 having an inlet 42, a variable sized passageway 44 and an outlet 46. The inlet 42 is in communication with port 23 in the mandrel body 16 for admitting gas, which flows through the variable sized passageway 44 which may be adjusted to control the flow therethrough and the gas then flows out the outlet 46. The body includes a setting and pulling head 43 and a bottom collet latch 51 and check valve 45.

An actuator 48 is longitudinally movable in the body 42 for varying the size of the passageway 44 for controlling the flow of gas through the valve 14. It is noted that the actuator 48 includes a universal joint 84 for allowing the valve 14 to be longitudinally flexible. The variable sized passageway is provided by an orifice ring having a port 50 and a plurality of different sized valve elements, such as valve elements 52, 54, 58 and 60, which are movable relative to the orifice port 50. The different sized valve elements are connected to the actuator 48 which moves the desired sized valve element 52–60 into the orifice 50 for adjusting the size of the passageway 44 between the valve element and the orifice 50. A hydraulic piston and cylinder assembly 64 includes a piston 66 and a cylinder 68, one of which, such as the piston 66, is connected to the actuator 48. While the piston and cylinder assembly may be hydraulically actuated one way with a spring return, it is preferable that the assembly 64 be a double acting assembly and is controlled by the hydraulic control lines 36a and 36b leading to opposite sides of the piston 66 and controlled hydraulically from the well surface.

Sensing means are connected to the actuator 48 for determining the position of the actuator and thus the size of the variable sized passageway 44. While any desirable sensing means, such as an electrical position transducer, could be used, the sensing means may include a spring-loaded collet 70 having a series of collet grooves 72, 74, 76, 78 and 80 and a shoulder 82 connected to the actuator 48 movable relative to the grooves 72–80. Thus, when the shoulder 82 is in the groove 72, as best seen, the valve element 52 is positioned in the orifice 50. Movement of the shoulder 82 through the ridges and grooves of the collet 72 will produce peaks and valleys in the hydraulic pressure exerted on the hydraulic piston and cylinder assembly 64 through lines 36a and 36b thereby sensing the position of the actuator and thus of the size of the variable passageway 44.

The valve 14 is shown in FIGS. 1C–1E in the run-in position, and includes a sleeve 86 which is telescopically movable in the body 40. The sleeve 86 includes a plurality of openings 88 which, when aligned with the inlet 42, opens communication with the interior of the body 40, but in the position shown in FIG. 1D is shown closing the inlet 42. A first shoulder 90 and a second shoulder 92 are provided on the actuator 48 for engaging and moving the sleeve 86 in opposite directions as will be discussed hereinafter.

In addition, a valve seat 94 (FIG. 1E) is shown between the inlet 42 and the outlet 46 and a valve element 96 connected to the actuator 48 is sized to seat on the valve seat 94 for opening and closing the valve seat on movement of the actuator 48.

Figure 9A:
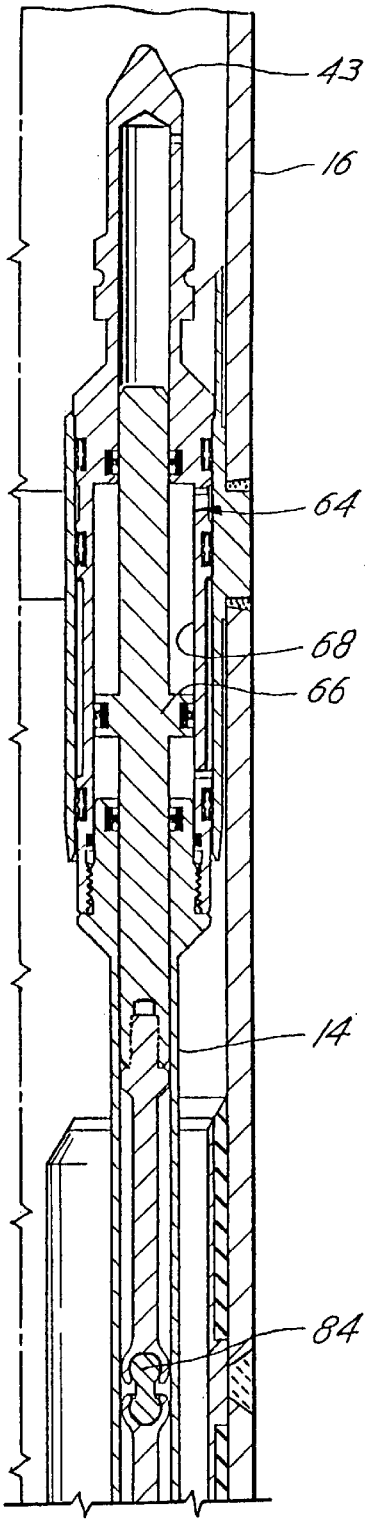
Figure 9B:
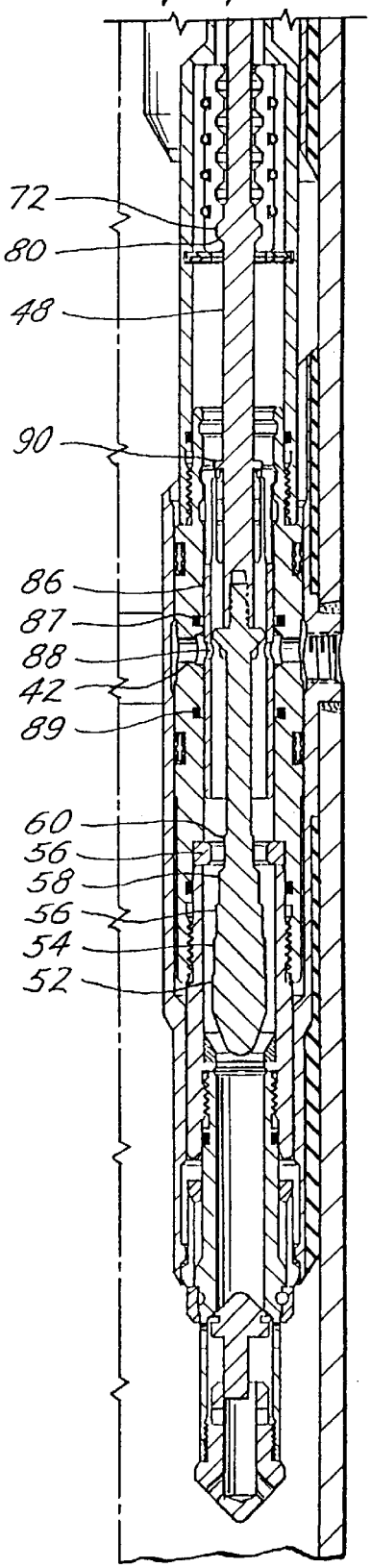

As discussed, the variable sized gas lift valve 14 is shown in the open position in FIGS. 1C, 1D and 1E in which the sleeve 86 closes the inlet port 42 and the check valve 45 is in the closed position. When the valve 14 is ready to be moved to the open position, as best seen in FIGS. 9A and 9B, the hydraulic piston and cylinder assembly 64 is actuated to move the actuator 48 downwardly moving shoulder 90 against the top of the sleeve 86 thereby moving the ports 88 across seal 87 and adjacent inlet 42. The valve 14 is now in the open position and since valve element 60 is positioned in the orifice 50, the valve 14 is now adjusted for maximum flow position which is indicated by the shoulder 72 being positioned in the collet groove 80. If it is now desired to place the valve 50 in less than the maximum flow position, the hydraulic piston and cylinder assembly 64 is actuated to bring one of the other valve elements 58, 56, 54, or 52 into the orifice 50.

Figure 10A:
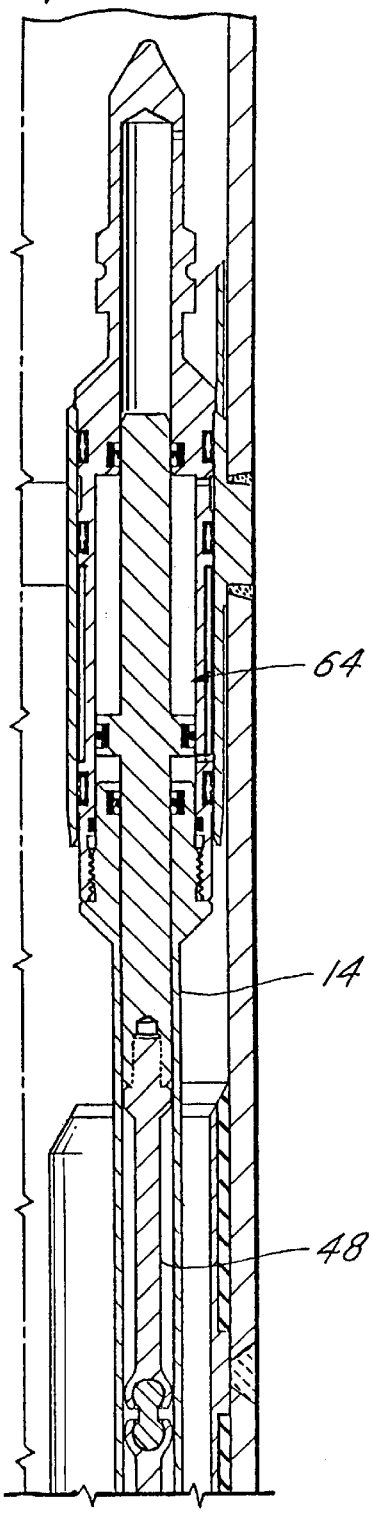
FIGS. 10A and 10B are continuations of each other and form an elevational view, in cross section, of the valve of FIGS. 9A and 9B but in the closed position by seating a valve element on a valve seat.
Figure 10B:
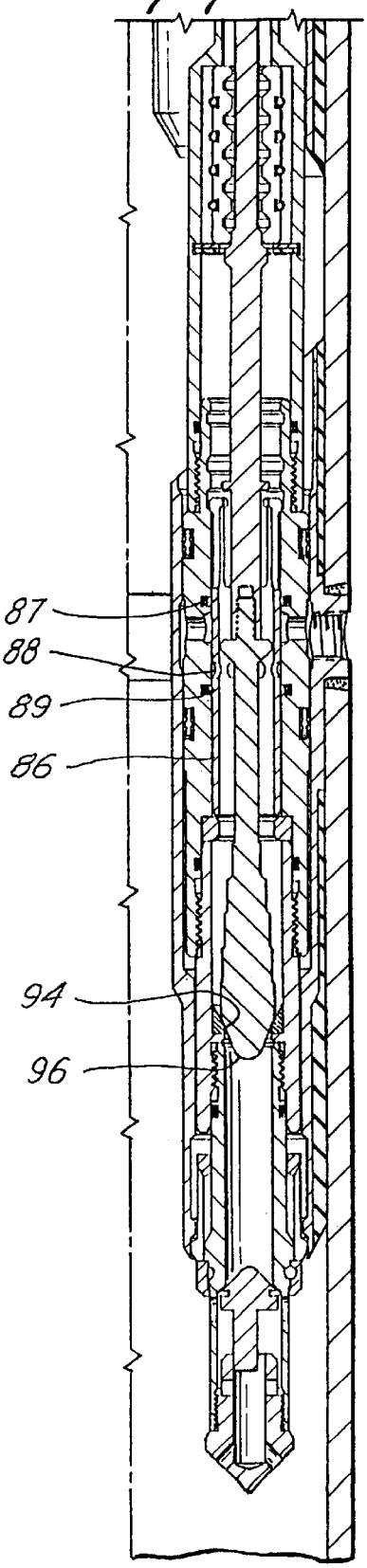

Referring now to FIGS. 10A and 10B, the valve 14 is shown in the closed position without dragging the ports 88 in the sleeve 86 across the seals 87 and 89 thereby protecting the life of the seals 87 and 89. In this node of operation, the hydraulic piston and cylinder assembly 64 is actuated to move the actuator 48 downwardly to seat the valve element 96 on the valve seat 94 and close off flow through the valve 14. It is to be noted from FIGS. 9A, 9B, 10A and 10B that the size of the passageway 44 may be adjusted from fully opened to fully closed without operating the sleeve 86.

Figure 11A:
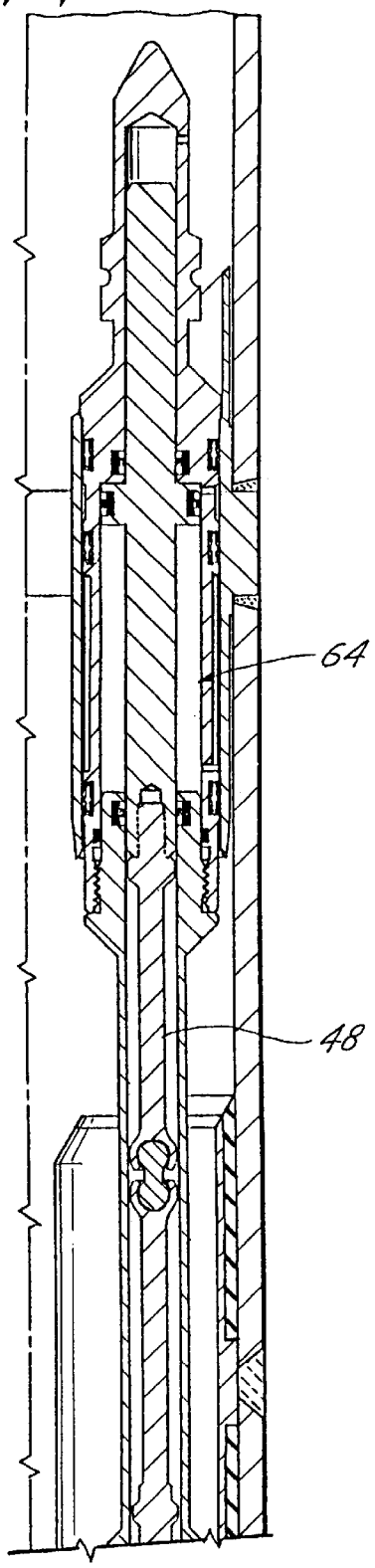
FIGS. 11A and 11B are continuations of each other and form an elevational view, in cross section, of the valve of FIGS. 9A and 9B, but in a closed position by having a sleeve retracted.
Figure 11B:
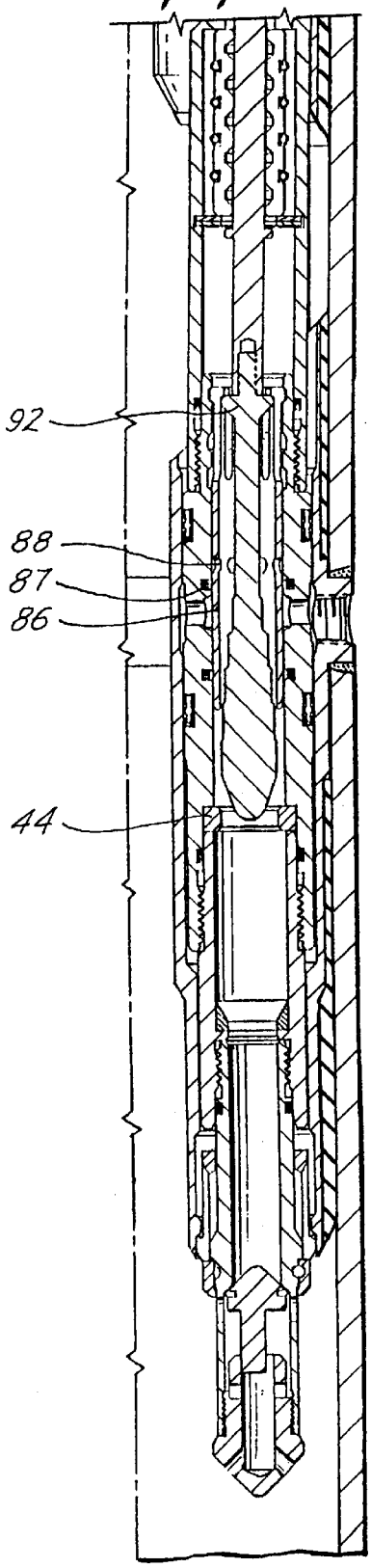
Figure 13:
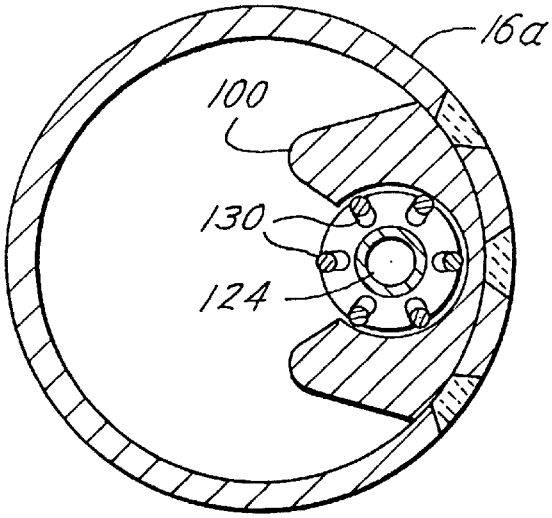
FIG. 13 is a cross-sectional view taken along the line 13—13 of FIG. 12A.
Figure 12A:
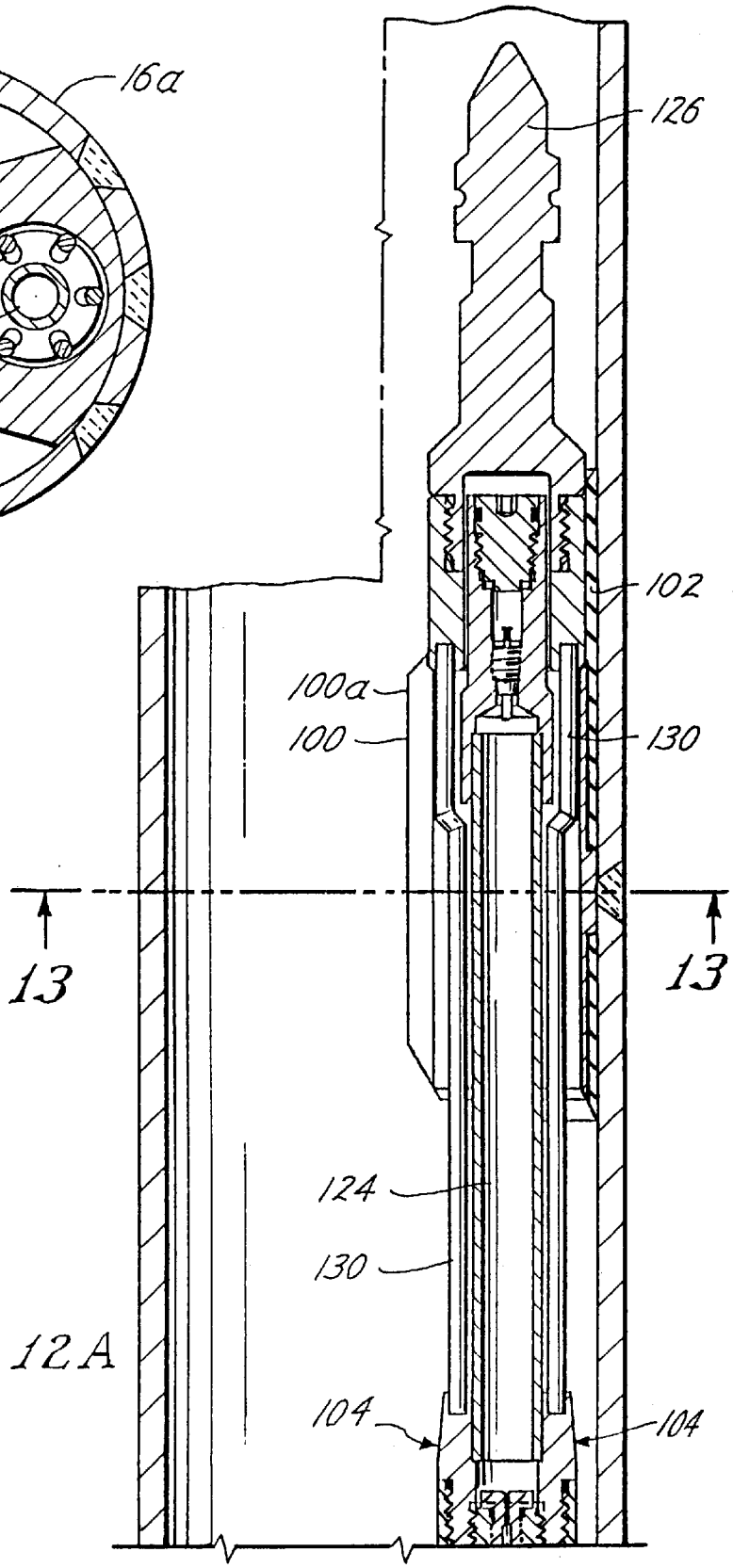
FIGS. 12A and 12B are continuations of each other and form an elevational view, in cross section, of another type gas lift valve which may be used with the mandrel of the present invention.
Figure 12B:
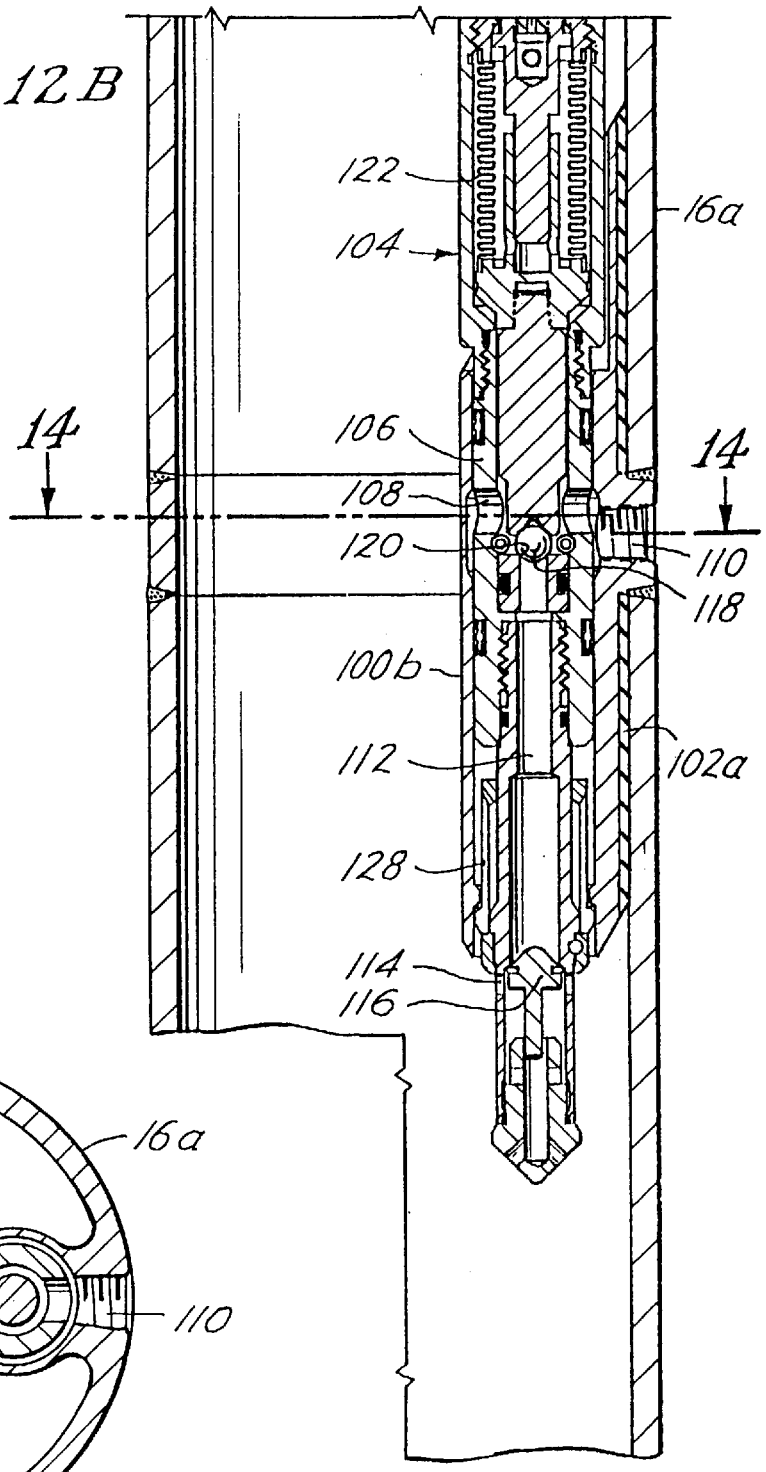
Figure 14:
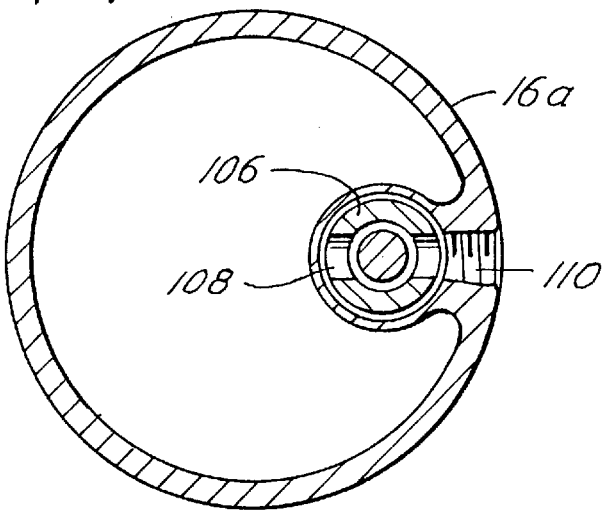
FIG. 14 is a cross-sectional view taken along the line 14—14 of FIG. 12B.

However, as best seen in FIGS. 11A and 11B, the valve 14 may be placed in a closed position by retracting the sleeve 86 by retracting the hydraulic piston and cylinder assembly 64 thereby moving the actuator 48 to cause the shoulder 92 to engage and retract the sleeve 86 by placing its ports 88 above the seal ring 87.

While the gas lift valve 14 disclosed hereinabove is of an adjustable type, other types of gas lift valves may be utilized with the mandrel 12 and, of course, the adjustable gas lift valve 14 may be used in other applications other than the mandrel 12.

Another embodiment of a gas lift valve which is suitable for use in the mandrel 12 and is also suitable for use separate from the mandrel 12 is illustrated in FIGS. 12A, 12B, 13 and 14.

The mandrel 12a includes a body 16a and further includes an orienting sleeve and deflector guide (not shown) similar to that previously disclosed and a sidepocket 100 consisting of pocket part 100a and pocket part 100b which are secured to the inside of the housing 16a by welds intermediate their ends and each part has an outside spaced from the inside of the housing 16a by a boot 102 and 102a, respectively. The valve, generally indicated by the reference numeral 104, includes a body 106 having an inlet 108 which is adapted to be in communication with a port 110 in the mandrel housing 16a a passageway 112, an outlet 114, a check valve 116. A valve consisting of a valve element 118 and seat 120 controls flow of gas through the passageway 110 and is in turn controlled by a gas charged bellows 122 which is connected to and controls the operation of the flow controlling valve 118 and 120. A gas containing compartment 124 is in communication with the bellows 122. A setting and pulling head 126 is connected to the body 106 and a collet lock 128 is connected to the body 106 for locking the body in the pocket 100. The gas lift valve 104 is longitudinally flexible as the gas compartment 124 which may be thin metal or plastic is longitudinally flexible similar to the valve illustrated in U.S. Pat. No. 5,170,815. However, the gas compartment 124 is normally neither stiff enough nor strong enough to withstand the jarring forces necessary to either set or retrieve the valve 104. Therefore, a plurality of separated longitudinally extending ribs 130 are connected to the head 126 and preferably surrounding the gas containing compartment 124 for providing longitudinal flexibility and longitudinal strength. While the particular valve 104 has been shown, for purposes of illustration, with a bottom latch 128, a top latch similar to a Camco BK latch may be used instead if desired. In any event, the gas lift valve 104 is longitudinally flexible, spoolable and may be wireline inserted and retrieved in the sidepocket mandrel 12a.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts, will readily suggest themselves to those skill in the art, and which are encompassed within the spirit of the invention and the scope of the appended claims.

What is claimed is:

1. A spoolable flexible sidepocket mandrel positioned in a coiled tubing comprising, a flexible spoolable circular housing [having the same size and shape as the coiled tubing and] forming a portion of the coiled tubing, said housing including an open bore communicating with the coiled tubing, an orienting sleeve secured to the inside of the housing for aligning a flow control device in the housing, *and* a sidepocket offset from the open bore for receiving a flow control device[, said pocket including a plurality of separate pocket parts each of which is secured to the inside of the housing, and a deflector guide aligned with the sidepocket, said guide including a plurality of separate guide parts each of which is secured to the inside of the housing].

2. The mandrel of claim 1 including a flexible boot positioned between the orienting sleeve and the inside of the housing.

3. The mandrel of claim 1 including, at least one hydraulic control line within the housing wall.

4. The mandrel of claim [1] *23* including a flexible boot positioned between at least some of the guide parts and the inside of the housing.

5. The mandrel of claim [1] *22* including, a flexible boot positioned between at least some of the pocket parts and the inside of the housing.

6. The mandrel of claim 1 wherein the orienting sleeve has an outside and ends and the outside of the orienting sleeve is spaced from the inside of the housing and the orienting sleeve is secured to the inside of the housing intermediate the ends of the orienting sleeve.

7. The mandrel of claim [1] *22* wherein the pocket parts each have an outside and ends and the outside of the pocket parts is spaced from the inside of the housing and [the] each pocket part is secured to the inside of the housing intermediate the ends of each respective pocket part.

8. The mandrel of claim [1] *23* wherein the guide parts each have an outside and ends and the outside of the guide parts is spaced from the inside of the housing and each guide part is secured to the inside of the housing intermediate the ends of each respective guide part.

9. The flexible sidepocket mandrel of claim 1 including a retrievable, longitudinally flexible, spoolable gas lift valve adapted to be inserted into and retrieved from the sidepocket.

10. The apparatus of claim 9 wherein the gas lift valve comprises, a housing, said housing having an inlet, an outlet, and a flow controlling valve operatively positioned between the inlet and the outlet, a gas charged bellows connected to and controlling the operation of the flow controlling valve, a gas containing compartment in communication with the bellows, a setting and pulling head connected to the body, and said body including a plurality of separated longitudinally extending ribs connected to the head for providing longitudinal flexibility and strength.

11. The apparatus of claim 10 wherein the ribs surround the gas containing compartment.

12. The apparatus of claim 9 wherein the gas lift valve is an adjustable gas lift valve comprising, a body having an inlet, a variable size passageway, and an outlet, an actuator longitudinally movable in the body for varying the size of the passageway, a hydraulic piston and cylinder assembly connected to the actuator for moving the actuator, and sensing means connected to the actuator for determining the position of the actuator.

13. The valve of claim 12 wherein the variable size passageway includes an orifice port and a plurality of different sized valve elements movable relative to the port.

14. The valve of claim 13 wherein the different sized valve elements are connected to the actuator.

15. The valve of claim 14 including, a valve seat between the inlet and the outlet, and one of the valve elements is sized to seat on the valve seat for opening and closing the valve seat on movement of the actuator.

16. The valve of claim 12 wherein the piston and cylinder assembly is double acting.

17. The valve of claim 12 wherein the sensing means includes a series of collet grooves and a shoulder movable relative to the grooves.

18. The valve of claim 12 including a sleeve telescopically movable relative to the body for opening and closing the inlet.

19. The valve of claim 18 including, first and second shoulders on the actuator for engaging and moving the sleeve in opposite directions.

20. The valve of claim 12 wherein the actuator includes a universal joint for allowing the valve to be longitudinally flexible.

*21. The mandrel of claim 1, wherein said flexible spoolable housing has substantially the same size and shape as the coiled tubing.*

*22. The mandrel of claim 1, wherein said side pocket includes a plurality of separate pocket parts each of which is secured to the inside of the housing.*

*23. The mandrel of claim 1, further comprising a deflector guide aligned with the sidepocket, said guide including a plurality of separate guide parts each of which is secured to the inside of the housing.*

*24. The mandrel of claim 22, further comprising a deflector guide aligned with the sidepocket, said guide including a plurality of separate guide parts each of which is secured to the inside of the housing.*

* * * * *